(12) United States Patent
Haag et al.

(10) Patent No.: US 10,773,700 B2
(45) Date of Patent: Sep. 15, 2020

(54) METHOD FOR BOOSTING THE BRAKING FORCE IN AN ELECTRONICALLY SLIP-CONTROLLABLE VEHICLE BRAKE SYSTEM HAVING ELECTROMECHANICAL BRAKE BOOSTING

(71) Applicant: Robert Bosch GmbH, Stuttgart (DE)

(72) Inventors: Florian Haag, Untergruppenbach (DE); Martin Marquart, Reichenbach (DE)

(73) Assignee: Robert Bosch GmbH, Stuttgart (DE)

( * ) Notice: Subject to any disclaimer, the term of this patent is extended or adjusted under 35 U.S.C. 154(b) by 1 day.

(21) Appl. No.: 16/214,631

(22) Filed: Dec. 10, 2018

(65) Prior Publication Data

US 2019/0193703 A1 Jun. 27, 2019

(30) Foreign Application Priority Data

Dec. 21, 2017 (DE) .................. 10 2017 223 565

(51) Int. Cl.
  *B60T 13/14* (2006.01)
  *B60T 8/40* (2006.01)
  (Continued)

(52) U.S. Cl.
  CPC ............ *B60T 13/146* (2013.01); *B60T 7/042* (2013.01); *B60T 8/4077* (2013.01); *B60T 8/442* (2013.01);
  (Continued)

(58) Field of Classification Search
  CPC .... B60T 13/146; B60T 8/4077; B60T 13/662; B60T 13/686; B60T 7/042;
  (Continued)

(56) References Cited

U.S. PATENT DOCUMENTS

| 4,919,493 A * | 4/1990 | Leiber ................. B60T 8/00 303/113.4 |
| 10,377,361 B2 * | 8/2019 | Blattert .................. B60T 8/321 |

(Continued)

FOREIGN PATENT DOCUMENTS

DE 102016225694 A1 * 6/2018

*Primary Examiner* — Pamela Rodriguez
(74) *Attorney, Agent, or Firm* — Norton Rose Fulbright US LLP; Gerard Messina

(57) ABSTRACT

The method relates to a method for boosting the braking force in an electromotor operated slip-controllable vehicle brake system having electromechanical brake boosting. The vehicle brake system includes a braking-intention detection device, an electromechanically actuatable brake booster, and an electronically actuatable brake-pressure control device. In the event of a malfunction of the brake booster, the boosting of the brake pressure is alternatively assumed by the brake-pressure control device. In the event of a malfunction of the brake boosting, it is checked whether a generation and a transmission of a trigger signal representing the actuation of the braking-intention detection device from the first electronic control device of the brake booster to a second electronic control device of the brake-pressure control device is possible, and if this is so, the trigger signal is transmitted via an existing communications link between the control devices.

5 Claims, 3 Drawing Sheets

(51) Int. Cl.
  *B60T 13/66* (2006.01)
  *B60T 7/04* (2006.01)
  *B60T 8/44* (2006.01)
  *B60T 13/16* (2006.01)
  *B60T 13/68* (2006.01)
  *B60T 13/74* (2006.01)
  *B60T 8/17* (2006.01)
  *B60T 8/32* (2006.01)

(52) U.S. Cl.
  CPC .......... *B60T 13/166* (2013.01); *B60T 13/662* (2013.01); *B60T 13/686* (2013.01); *B60T 13/745* (2013.01); *B60T 8/17* (2013.01); *B60T 8/321* (2013.01); B60T 2270/402 (2013.01)

(58) Field of Classification Search
  CPC .. B60T 2270/402; B60T 8/4072; B60T 8/442; B60T 8/885; B60T 8/17616; B60T 13/116; B60T 13/745; B60T 8/17; B60T 8/321
  USPC ........ 303/113.1, 20, 122.02, 122.03, 122.09, 303/122.1, 122.11
  See application file for complete search history.

(56) References Cited

U.S. PATENT DOCUMENTS

2006/0163941 A1\* 7/2006 Von Hayn ............... B60T 7/042
 303/155
2011/0029215 A1\* 2/2011 Willmann ............... B60T 7/042
 701/78
2019/0315326 A1\* 10/2019 Haag .................... B60T 13/662

\* cited by examiner

METHOD FOR BOOSTING THE BRAKING FORCE IN AN ELECTRONICALLY SLIP-CONTROLLABLE VEHICLE BRAKE SYSTEM HAVING ELECTROMECHANICAL BRAKE BOOSTING

RELATED APPLICATION INFORMATION

The present application claims priority to and the benefit of German patent application no. 10 2017 223 565.9, which was filed in Germany on Dec. 21, 2017, the disclosure which is incorporated herein by reference.

FIELD OF THE INVENTION

The present invention relates to a method for boosting the braking force in an electronically slip-controllable vehicle brake system having electromechanical braking-force boosting.

BACKGROUND INFORMATION

Vehicle brake systems are generally equipped with a device for detecting a braking intention. A variable control force is externally applicable to these braking-intention detection devices, which then convert the control force into a correlating actuation travel. For this purpose, braking-intention detection devices normally have a brake master cylinder which a driver is able to operate with the aid of a brake pedal or a brake lever.

Vehicle brake systems forming the basis of the present invention are furthermore equipped with an electromechanical brake booster, which executes an actuation travel as a function of the actuation travel of the braking-intention detection device via a first electronic control device in order to boost the brake pressure generated by the driver.

In this context, an existing travel sensor system supplies a travel signal that correlates with the actuation travel of the braking-intention detection device to the first electronic control device. For this purpose, known travel sensors may be equipped with an absolute travel sensor or, as an alternative, with a differential travel sensor. While an absolute travel sensor is used for measuring the actuation travel of the braking-intention detection device, a differential-travel sensor measures the actuation travel of the braking-intention detection device relative to the actuation travel of the electronic brake booster, and thus measures a travel difference between the two devices.

In addition, vehicle brake systems that form the basis of the present invention are also equipped with an electronic brake-pressure control device. It adapts the brake pressure of the individual wheel brakes to the slip conditions of the respectively allocated wheels of the vehicle. The brake-pressure control device is equipped with a second electronic control device for this purpose, which, in addition to valves that may be acted upon electronically, controls a pressure generator able to be driven by an electric motor. Depending on the function scope, vehicle brake systems having such brake-pressure control devices are also known under the terms ABS, ASR or ESP vehicle brake systems.

A data bus connection or a communications link is available between the first electronic control device of the brake booster and the second electronic control device of the brake-pressure control device, via which a first signal, which represents the operativeness of the brake boosting, and a second signal, which represents the actuation of the braking-intention detection device, are able to be transmitted. This second signal may be a binary trigger signal, which is set when a driver has exceeded a specifiable actuation threshold, e.g., a minimum actuation travel of the braking-intention detection device.

In certain vehicle brake systems, during a state of an existing function interruption of the brake boosting, this brake boosting is alternatively assumed by the pressure generator of the brake-pressure control device. An actuation signal for the pressure generator is supplied by the allocated second electronic control device. A method for calculating this actuation signal is described in the earlier patent application DE 10 2016 225 694. This method is based on the described binary trigger signal, which is offset against a signal that considers the system or brake pressure generated in the brake-pressure control system by the actuation of the braking-intention detection device.

In this context it is disadvantageous that the binary trigger signal has to be transmitted to the second electronic control device of the brake-pressure control device via a discrete connection line because a transmission of this trigger signal via the communications link between the first electronic control device of the brake booster and the second electronic control device of the brake-pressure control device is no longer possible. The reason for this is that a status signal is superimposed onto the trigger signal, which sets the status of the trigger signal from currently "signal valid" to "signal invalid" when an interruption has been detected at the electronic brake booster. That is to say, the described method is used even when the travel signal from the braking-intention detection device is still available since the components for the generation and the transmission of this travel signal continue to be operational. For example, the latter case may arise when an exclusively mechanical fault exists at the brake booster but the electronic system is still functional; when a deactivation of the electronic brake booster takes place due to a detected rise in temperature or due to an excessive vehicle system voltage or a vehicle system voltage that is too low; or when the trigger event is a fault that occurred when a data memory in which, for example, the function status of the brake booster is stored is read out.

SUMMARY OF THE INVENTION

In contrast to the related art, the method according to the present invention for boosting the braking force in an electronically slip-controllable vehicle brake system according to the features of the independent claim 1 has the advantage that in all cases in which the components required for generating and transmitting a travel signal that represents an actuation travel of the braking-intention detection device are functional notwithstanding an existing disturbance in the brake boosting, a transmission of the trigger signal takes place via the communications link between the electronic control devices of the brake booster and the brake-pressure control device. According to the present invention this is achieved by setting the status signal that determines the status of the trigger signal to "signal valid" in the described cases according to the present invention. In this way the trigger signal is then able to be transmitted from the first control device of the brake-force booster to the second electronic control device of the brake-pressure control device via the communications link, and a separate connection line for the transmission of this signal is able to be saved without replacement. A vehicle-brake system that operates according to the method of the present invention exhibits a better operating behavior in its fallback level, i.e. when the brake-force boosting is disturbed, at a low outlay in terms of parts and assembly. The operational safety as well as especially the braking behavior of a motor vehicle equipped with a vehicle brake system on which the present invention is based is therefore broadened and improved. The method according to the present invention manages without additional mechanical or electronic components and is able to be implemented in a cost-effective manner by utilizing a communications link between electronic control devices that is already provided as it is.

Additional advantages or advantageous further developments of the present invention result from the following description.

The method on which the present invention is based will be described in detail in the following text. This description is based on FIGS. 1 through 3.

DETAILED DESCRIPTION

Figure 1:
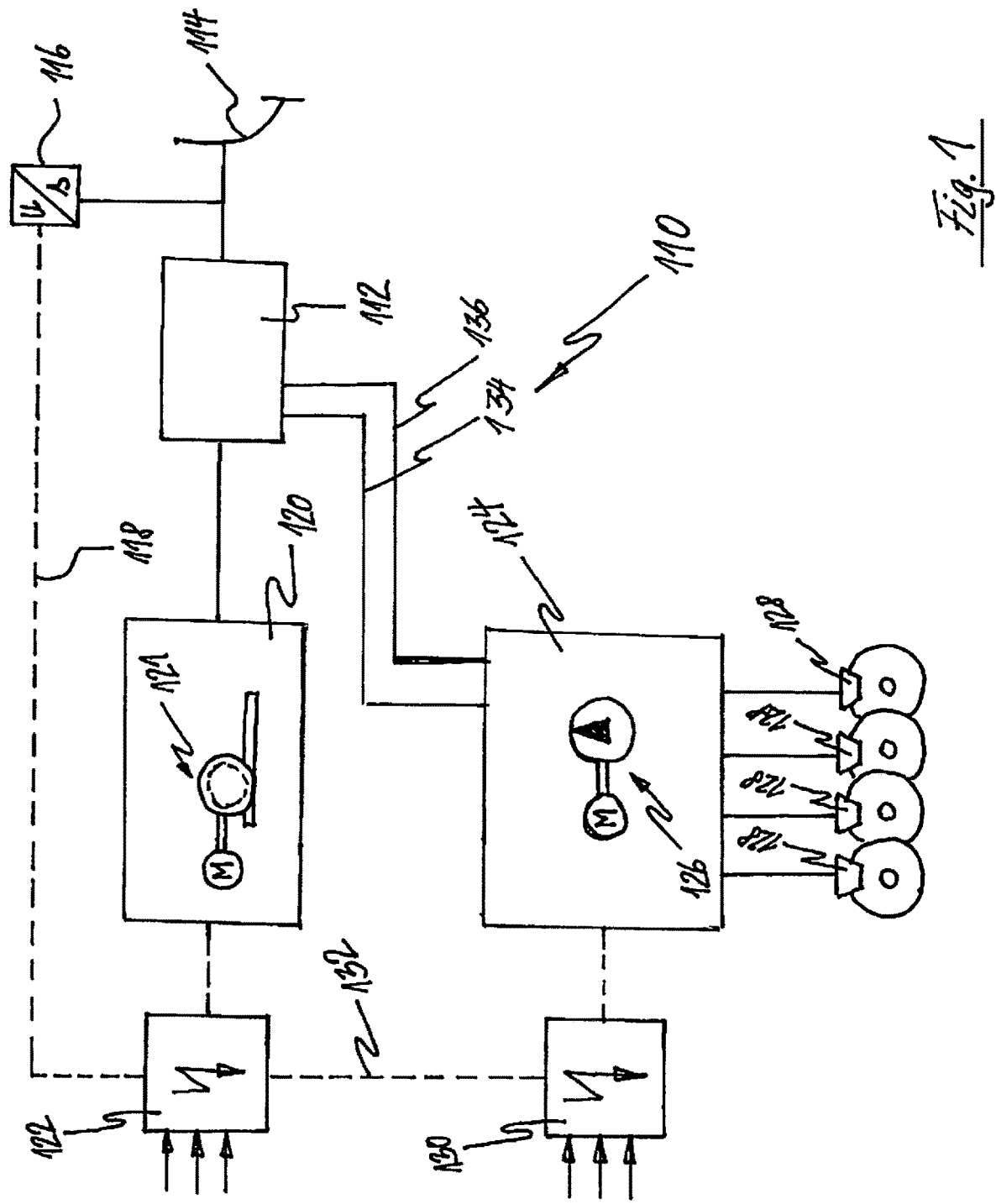
FIG. 1 shows the basic configuration of a vehicle brake system on which the present invention is based.

The present invention requires an electronically slip-controllable vehicle brake system featuring electromechanical brake boosting. An exemplary configuration of such a vehicle brake system is shown in FIG. 1. The illustrated vehicle brake system 110 has a braking-intention detection device 112, which is exemplarily able to be actuated via a brake pedal 114 and supplies two connected brake circuits 134; 136 with brake pressure in each case. To generate the brake pressure, braking-intention detection device 112 cooperates with an electromechanical brake booster 120. By way of example, the latter has an electromotoric drive 121, which is able to be actuated by a first electronic control device 122 that is allocated to brake booster 120. For the generation of an actuation signal for drive 121, electronic control device 122 evaluates travel signal 118 from a travel sensor system 116, which detects an actuation travel of braking-intention detection 112.

In addition, vehicle brake system 110 is equipped with an electronic brake-pressure control device 124, which distributes the brake pressure jointly supplied by brake booster 120 and braking-intention detection device 112 to wheel brakes 128, which are connected to this brake-pressure control device 124. In the process, the brake pressure for each wheel is individually adapted by brake-pressure control device 124 to the slip conditions of the respectively allocated wheels. Brake-pressure control device 124 has a second electronic control device 130 for this purpose, which, among other things, actuates an electromotorically controllable pressure generator 126 of brake-pressure control device 124.

Via a communications link 132, the two control devices 122 and 130 exchange control signals with each other. For example, if a malfunction is present at brake booster 120, then it is possible that the brake boosting is alternatively carried out by pressure generator 126 of braking-pressure control device 124.

However, a basic precondition for utilizing travel signal 118 of braking-intention detection device 112 during a malfunction of the brake boosting is that, notwithstanding the existing malfunction, first electronic control device 122 of brake booster 120 is still operative, as is travel sensor system 116 for generating travel signal 118 representing an actuation travel of braking-intention detection device 112 and also communications link 132 between first electronic control device 122 of electromechanical brake booster 120 and second electronic control device 130 allocated to brake-pressure control 124.

Figure 2:
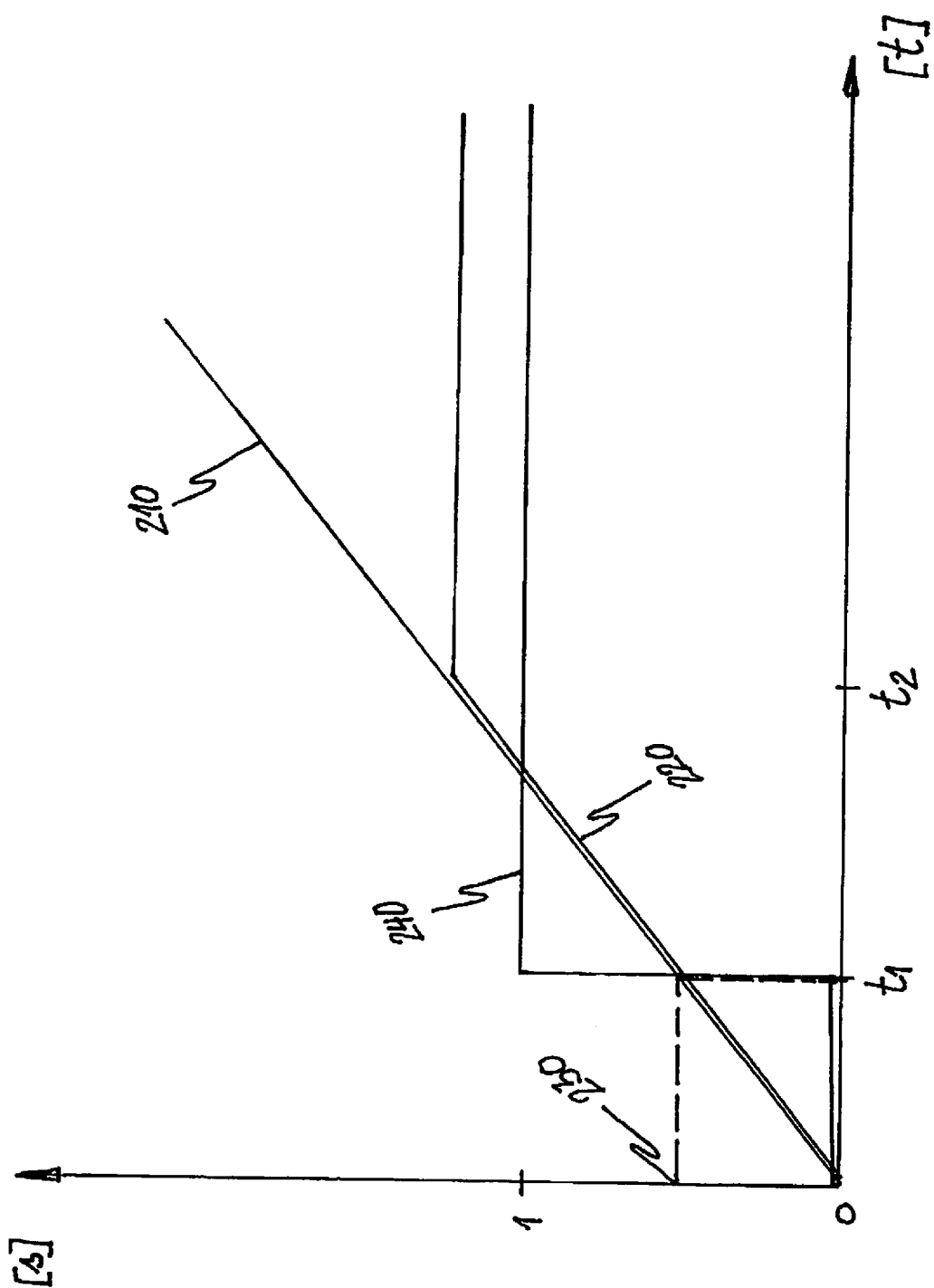
FIG. 2 shows a travel/time diagram of the method-relevant signals.

If these preconditions are met, then travel sensor system 116 transmits travel signal 118 to first electronic control device 122 once braking-intention detection device 112 has been actuated. A threshold, specifiable in an application-specific manner, is stored in control device 122. When this threshold value is exceeded, control device 122 generates a signal, which represents an actuation of braking-intention detection device 112 on the part of the driver. This signal may be a binary trigger signal 240 (FIG. 2).

First electronic control device 122 of brake booster 120 conducts this trigger signal to second electronic control device 130 of brake-pressure control device 124 via the still intact communications link 132. However, this requires that a status signal 360 (FIG. 3) which superimposed onto trigger signal 240 indicates the status "signal valid" notwithstanding the malfunction of brake boosting as such. The incoming trigger signal is then used in second electronic control device 130 for calculating an actuation signal 350 (FIG. 3) with the aid of which pressure generator 126 of brake-pressure control unit 124 is actuated in order to boost the brake pressure.

Since the driver is unable to notice that the braking force applied by the driver has been boosted by brake-pressure control device 124, and not as intended by brake booster 120, the interrupted operation of brake booster 120 is indicated to the driver, which may be with the aid of an optical signal in the vehicle cockpit.

The figure that shows a travel/time diagram illustrates the characteristic of the mentioned signals.

First signal 210 shows the absolute travel using which the driver actuates braking-intention detection device 112. Ideally, this is a straight line that extends at an angle of inclination with respect to the horizontal line. The angle of inclination depends on an actuation rate at which the driver is acting upon braking-intention detection device 112.

Second signal 220 shows a differential travel, which indicates the manner in which braking-intention detection device 112 is moving relative to an actuation stroke of brake booster 120. At the start of an actuation of braking-intention detection device 112, the absolute travel following first signal 210 and the differential travel following second signal 220 are identical since brake booster 120 does not execute an actuation stroke on account of the monitored existing interruption, which means that only braking-intention detection device 112 is moved. However, for construction-related reasons, braking-intention detection device 112 has a mechanical stop, which prevents a further increase in the differential travel after this stop has been reached. Having arrived at the stop, braking-intention detection device 112 and brake booster 120 are mechanically coupled with each other and move in tandem. The differential travel thus has reached its maximum at instant t2 and no longer increases.

Threshold value 230, which is stored in first electronic control device 122, is plotted on the ordinate. This threshold value 230 indicates when an actuation of braking-intention detection device 112 may reliably be inferred. It is freely selectable in an application-specific manner. When this threshold value 230 is exceeded at instant t1, a third signal is generated. This third signal is a binary trigger signal 240, or in other words, a signal that changes its value in a unit-step function. It indicates whether or when the driver has actuated braking-intention detection device 112.

Figure 3:
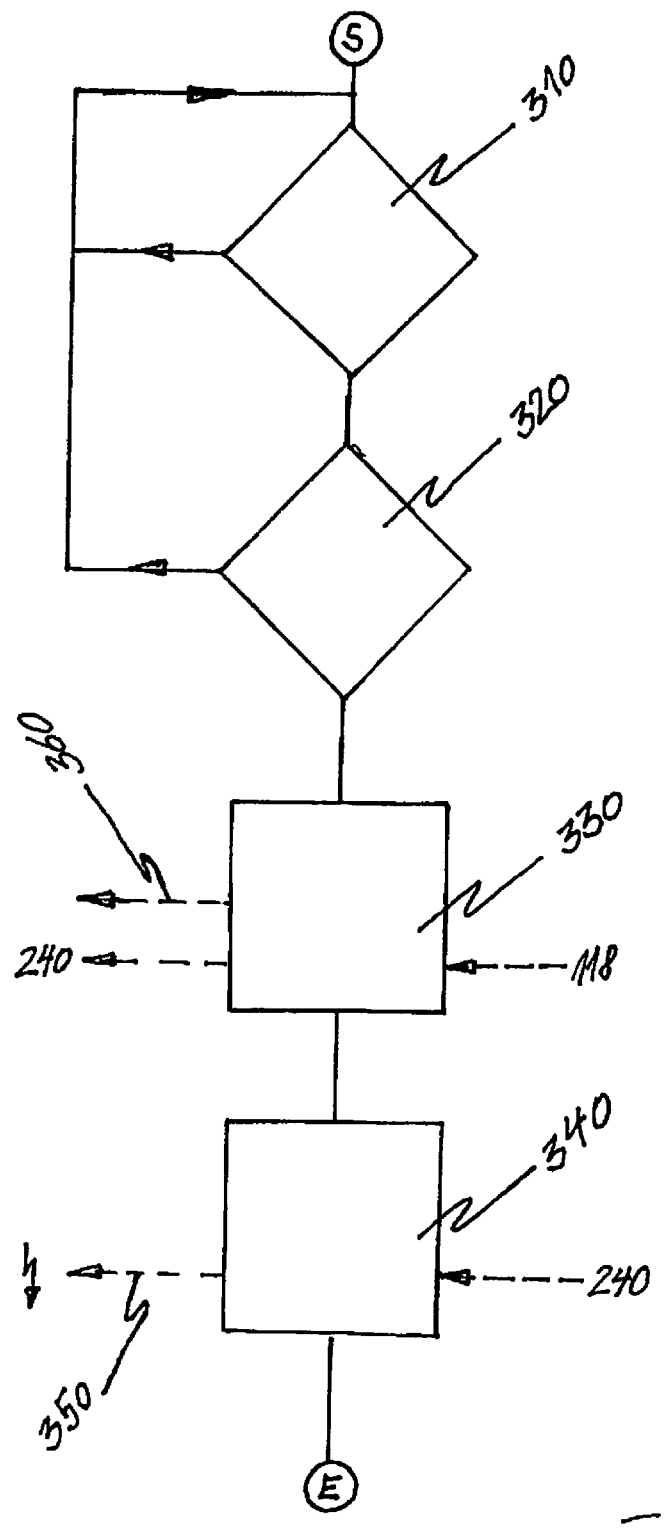
FIG. 3 shows a flow diagram of the method according to the present invention.

FIG. 3 illustrates the method that forms the basis of the present invention with the aid of a flow diagram.

In a first method step 310, a function check of brake booster 120 is carried out. If a fault is detected during this function check, then it is furthermore checked in step 320 whether existing travel sensor system 116, first electronic control device 122 of brake booster 120 and communications link 132 between electronic control devices 122 and 130 are still functional. If the operational reliability of these components 116, 120, 132 has been determined, and if a braking operation is taking place, trigger signal 240, which depends on a travel signal 118 of travel sensor system 116, is generated by first electronic control device 122 in step 330, trigger signal 240 representing an actuation of braking-intention detection device 112. In addition, a status signal 360 that is superimposed onto trigger signal 240 is set to "signal valid" so that trigger signal 240 is able to be transmitted to second electronic control device 130 of brake-pressure control device 124 in step 340 via intact communications link 132. There, incoming trigger signal 240 serves as the basis for calculating an actuation signal 350 for electromotorically driven pressure generator 126, taking the brake boosting into account. Pressure generator 126 of braking-pressure control device 124 actuated by this actuation signal 350 then supplies connected wheel brakes 128 with a pressure arrangement using a correspondingly boosted brake pressure.

In contrast, if no function interruption of brake booster 120 is able to be detected in step 310, then the provided method is terminated and repeated at some later point in time. In the same way, if at least one of the three components (travel sensor system 116; control device 122; or communications link 132) is not functional (check according to step 320), then the described method is unable to be carried out, is terminated accordingly, or may possibly be repeated.

It is of course conceivable to change or supplement the described exemplary embodiment without departing from the core idea of the present invention.

What is claimed is:

1. A method for boosting a braking force in an electronically slip-controllable vehicle brake system having electromechanical brake boosting, providing a communications link between a first electronic control device of a brake booster and a second electronic control device of a brake-pressure control device, wherein the vehicle brake system includes a braking-intention detection device to which an actuation travel correlating with the applied braking force is allocatable, the brake booster being drivable by the first electronic control device to execute an actuation stroke as a function of the actuation travel of the braking-intention detection device, a travel sensor system which outputs a travel signal that correlates with the actuation travel of the braking-intention detection device, and the brake-pressure control device having the second electronic control device and a drivable pressure generator;

checking, for an existing disturbance in the brake boosting, whether the travel sensor system, the first electronic control device of the brake booster, and the communications link between the control devices are functional; and generating, via the first electronic control device, if the devices are functional, a trigger signal as a function of a travel signal from the travel sensor system, and transmitting the trigger signal via the communications link to the second electronic control device.

2. The method of claim 1, wherein the trigger signal includes a binary signal.

3. The method of claim 2, wherein a status signal is superimposed onto the trigger signal, which defines the status of the trigger signal.

4. The method of claim 1, wherein a status signal is superimposed onto the trigger signal to define a status of the trigger signal.

5. The method of claim 4, wherein, using the status signal, a first status "trigger signal valid" or a second status "trigger signal invalid" is specifiable, and the first status is assigned if it has been determined during a braking operation using a faulty brake booster that the travel sensor system, the first electronic control device of the brake booster, and the communications link between the first electronic control device of the brake booster and the second electronic control device of the brake-pressure control device were detected as functional.

* * * * *